US010528985B2

(12) United States Patent
Dey et al.

(10) Patent No.: US 10,528,985 B2
(45) Date of Patent: Jan. 7, 2020

(54) DETERMINING A PERSONALIZED ADVERTISEMENT CHANNEL (71) Applicant: International Business Machines Corporation, Armonk, NY (US)

(72) Inventors: Prasenjit Dey, Bangalore (IN); Vijay Ekambaram, Bangalore (IN); Vikas Joshi, Bangalore (IN); Ramasuri Narayanam, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 862 days.

(21) Appl. No.: 14/968,040

(22) Filed: Dec. 14, 2015

(65) Prior Publication Data

US 2017/0169478 A1 Jun. 15, 2017

(51) Int. Cl.
*G06Q 30/02* (2012.01)

(52) U.S. Cl.
CPC ..... *G06Q 30/0271* (2013.01); *G06Q 30/0251* (2013.01); *G06Q 30/0255* (2013.01); *G06Q 30/0267* (2013.01)

(58) Field of Classification Search
CPC ........... G06Q 30/0251; G06Q 30/0271; G06Q 30/0255; G06Q 30/0267
See application file for complete search history.

(56) References Cited

U.S. PATENT DOCUMENTS 6,449,657 B2 * 9/2002 Stanbach, Jr. ......... G06Q 30/02 709/245
8,200,667 B2    6/2012 Choe et al.
(Continued)

FOREIGN PATENT DOCUMENTS

EP    1538535 A3    6/2005
WO   2009101954 A1   8/2009
(Continued)

OTHER PUBLICATIONS

Parmar, K. Android Notification Listener Service Example, http://kpbird.blogspot.com/2013/07/android-notificationlistenerservice.html, Jul. 31, 2013.
(Continued)

*Primary Examiner* — Raquel Alvarez
(74) *Attorney, Agent, or Firm* — Ryan, Mason & Lewis, LLP (57) ABSTRACT Methods, systems, and computer program products for determining a personalized advertisement channel are provided herein. A computer-implemented method includes processing multiple data sources associated with a user based on data derived from multiple notification messages accessed via an operating system feature of a mobile device of the user; determining a current state in connection with a product and/or service based on said processing, wherein said current state comprises a current likelihood that the user will purchase the product and/or service; computing probabilities, conditioned on each of multiple advertisement media, that the user will transition from a first state to a second state based on said processing; and identifying one of the advertisement media to implement with the product and/or service to transition the user from the current state to a separate user state, wherein said identifying is based on (i) the current state and (ii) the multiple computed probabilities.

20 Claims, 7 Drawing Sheets

(56) References Cited

U.S. PATENT DOCUMENTS

| | | | |
|---|---|---|---|
| 8,321,278 | B2 | 11/2012 | Haveliwala et al. |
| 8,396,746 | B1 | 3/2013 | Wang |
| 8,655,667 | B2 | 2/2014 | Chandrasekar et al. |
| 8,762,302 | B1* | 6/2014 | Spivack ............... G06N 5/046 706/12 |
| 8,798,852 | B1* | 8/2014 | Chen .................. G06F 21/44 701/29.6 |
| 9,032,321 | B1 | 5/2015 | Cohen et al. |
| 9,319,379 | B1* | 4/2016 | Burcham ............... H04W 8/26 |
| 2002/0026356 | A1* | 2/2002 | Bergh ................... G06Q 10/10 705/14.53 |
| 2003/0055762 | A1 | 3/2003 | Holt |
| 2009/0271228 | A1 | 10/2009 | Bilenko et al. |
| 2011/0066497 | A1 | 3/2011 | Gopinath et al. |
| 2013/0005478 | A1 | 1/2013 | McCaffeny et al. |
| 2013/0095458 | A1 | 4/2013 | Cha et al. |
| 2013/0246049 | A1 | 9/2013 | Mirhaji |
| 2015/0199770 | A1* | 7/2015 | Wallenstein ............ G06Q 50/01 705/26.2 |
| 2016/0148233 | A1* | 5/2016 | Dangaltchev ........... H01Q 9/285 705/7.35 |
| 2017/0161779 | A1* | 6/2017 | Bowers ............... G06Q 30/0247 |

FOREIGN PATENT DOCUMENTS

| | | | | |
|---|---|---|---|---|
| WO | 2014121066 A1 | 8/2014 | | |
| WO | WO-2015048338 A1 * | 4/2015 | ............. | H04W 4/21 |

OTHER PUBLICATIONS

Kumar et al., Rethinking Speech Recognition on Mobile Devices, IUI4DR, Feb. 13, 2011.

Nexiwave, Keyword Spotting Engine, http://nexiwave.com/index.php/site-map/keyword-spotting-engine, Dec. 14, 2015.

Cohen, J., Embedded Speech Recognition Applications in Mobile Phones: Status, Trends, and Challenges, ICASSP 2008.

\* cited by examiner

DETERMINING A PERSONALIZED ADVERTISEMENT CHANNEL

FIELD

The present application generally relates to information technology, and, more particularly, to customized communication technology.

BACKGROUND

With the advent of smart phones, social media and other communication mechanisms, the number of ways by which to send a communication (such as an advertisement, for example) to a user has increased. By way of example, advertisement media and/or channels can include a face-to-face communication, a voice/telephone call, a short message service (SMS) communication, a Web communication, a Twitter® communication, a Facebook® communication, a communication on an alternate messaging application, etc. Accordingly, challenges can be created in determining an appropriate and/or effective medium by which to advertise to a user.

SUMMARY

In one embodiment of the present invention, techniques for determining a personalized advertisement channel are provided. An exemplary computer-implemented method can include steps of processing multiple data sources associated with a user based on data derived from multiple notification messages accessed via an operating system feature of a mobile device of the user, and determining a current user state in connection with a product and/or service based on the processing step, wherein the current user state comprises a current likelihood that the user will purchase the product and/or service. The method can also include computing multiple probabilities, conditioned on each of multiple advertisement media, that the user will transition from a first user state to a second user state based on the processing step, wherein the second user state comprises a higher likelihood that the user will purchase the product and/or service than the first user state. Further, the method can also include identifying one of the multiple advertisement media to implement in connection with the product and/or service to transition the user from the current user state to a separate user state, wherein the identifying step is based on (i) the current user state and (ii) the multiple computed probabilities.

In another embodiment of the invention, an exemplary computer-implemented method can include computing multiple probabilities, conditioned on (i) each of multiple advertisement media and (ii) one or more temporal elements, that the user will transition from a first user state to a second user state based on the processing step, wherein the second user state comprises a higher likelihood that the user will purchase the product and/or service than the first user state. Such an embodiment can additionally include identifying (i) one of the multiple advertisement media to implement in connection with the product and/or service and (ii) an interval of time during which to implement an advertisement to transition the user from the current user state to a separate user state, wherein the identifying step is based on (a) the current user state and (b) the multiple computed probabilities.

Another embodiment of the invention or elements thereof can be implemented in the form of an article of manufacture tangibly embodying computer readable instructions which, when implemented, cause a computer to carry out a plurality of method steps, as described herein. Furthermore, another embodiment of the invention or elements thereof can be implemented in the form of an apparatus including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an embodiment of the present invention includes determining and/or suggesting a personalized advertisement channel. At least one embodiment of the invention can include implementing a software application (app) on a user's mobile device (such as a smart phone, for example) that uses the mobile device's notification messages to access multiple data sources associated with the user. Based on such notifications data, at least one embodiment of the invention includes detecting a user state based on the user's activity on the mobile device. Such activity can include, for example, telephone calls, emails, SMS communications, Twitter® communications, Facebook® messages, web clicks, etc. Accordingly, one or more embodiments of the invention can include deriving information from various data sources without explicit support from those data sources. By tapping into the operating system (OS) feature of notifications (which is a common hub for messages and/or information received in a mobile device), such an embodiment can include obtaining rich data as inputs for use in connection with the techniques detailed herein.

Additionally, one or more embodiments of the invention can further include predicting the most probable advertisement medium to change the detected user state. Such predicting can be carried out, for example, by analyzing the user's history of user state transitions and detecting the advertisement medium responsible for change(s). In the absence of historical records, at least one embodiment of the invention can also include utilizing user network characteristics to determine a preferred advertisement medium. As used herein, user network characteristics refer to preferences of users who are similar to a current user. Additionally, similarity between users can be determined via a network of users connected based on characteristics.

As further detailed herein, determining preferred advertisement channels for sending personalized advertisements of a product or service to a user can also include creating a user profile by collecting user data and recommending advertisements by analyzing extended notifications on the user's mobile device. One or more embodiments of the invention can additionally include dynamically determining the user state for the product of interest from the created user profile, and detecting the most effective (based, for example, on cost and conversion considerations) channel for advertisement by analyzing the history of user state transitions for detecting the advertisement medium responsible for each such change.

By way of illustration, user state transitions related to buying a product can include, for example, the following. State (S) 0 can be represented by a lack of evident words, as well as a lack of interested and/or buying activity; S1 can be represented by evidence of the user contemplating an attempt to buy the product; S2 can be represented by evidence of the user actively attempting to buy the product (for example, searching online, visiting a shop, reading reviews); and S3 can be represented by evidence that the user bought the product (the user, for example, created a review for the product online). Additionally, in one or more embodiments of the invention, user state transitions can be modeled as a Markov decision process (MDP). The below example shows a user state estimated from a Markov decision process.

As such, and by way of illustration, consider the following example user profile:
User Name: X
User Interests:
  1. Real Estate:
     Related records: {Voice, 12}, {SMS, 14}, {Clicks, 34}, {Messaging App, 5}, {Facebook®, 12} {Twitter®, 10}. The above-noted numerical values represent the number of times that the user has used the aforementioned medium to communicate about the mentioned interest. The values are calculated as a simple count of respective records.
     User state transitions: {$S_1$, April 20, [thinking of looking for an apartment] }, {$S_2$, April 23, [visited an apartment] }, {$S_3$, May 21, [new apartment is great] }.
     User state transition probabilities:
       {$S_1$, $S_2$}→{Voice, 0.1}, {SMS, 0.1}, {Clicks, 0.7}, {Messaging App, 0.05}, {Facebook®, 0.05}, {Twitter®, 0.0}.
       {$S_2$, $S_3$}→{Voice, 0.9}, {SMS, 0.1}, {Clicks, 0.0}, {Messaging App, 0.0}, {Facebook®, 0.0}, {Twitter®, 0.0}. The above-noted decimal/numerical values represent the probability values for the transition from state i to state j from the respective medium. The values are calculated as a ratio of the number of times that the state transition occurred because of use of the respective channel for communication divided by the total number of times that the transition occurred from state i to state j. For example, {$S_1$, $S_2$}→{Voice, 0.1}, {SMS, 0.1}, {Clicks, 0.7}, {Messaging App, 0.05}, {Facebook®, 0.05}, {Twitter®, 0.0} indicates that a state transition from 1 to 2 occurred due to the voice channel 10% of the time, due to the SMS channel 10% of the time, due to the click medium 70% of the time, due to an App 5% of the time, and due to Facebook® 5% of the time. Note that the various values sum to 1.

The above example user profile indicates that User X is thinking and/or talking about apartments. Also, according to the example profile, User X responds well to web advertisements (clicks) to become aware of the product (as indicated by the largest number of related records and the largest $S_1$ to $S_2$ state transition value). However, a telephone and/or voice conversation, according to the example profile, is the most effective means causing User X to buy the product (as indicated by the largest $S_2$ to $S_3$ state transition value).

Accordingly, and as detailed herein, at least one embodiment of the invention includes extracting data from notification messages associated with a given user mobile device, determining and/or generating a micro-managed user profile associated with the user of the mobile device, and determining the most preferred means of transmitting an advertisement for a given product to the user.

In connection with data extraction from extended notifications messages, one or more embodiments of the invention include collecting user data across multiple data sources and/or device applications to create a micro-managed user profile (such as detailed in the example profile above). Such data collection includes implementing a data collection mechanism that is privacy-aware, preventing the data collection to extend beyond the boundaries of the specific user in question. Data collection from extended notifications can require an exchange of messages between the sender and the receiver. The mechanism of such a transfer can be implemented in a privacy preserving setting by encrypting the data before transmission.

As used in connection with one or more embodiments of the invention, extended notifications commonly provide more details than are provided by normal notifications. For example, if a chat application enables extended notifications, the complete chat text can be displayed in a notification tab (as opposed to an abbreviated version or simply an indication that a chat communication has arrived).

Also, in connection with many mobile devices, any application in the mobile device or paired alternate device (such as a wearable watch, glasses, etc.) can read and/or access the extended notifications if the user of the mobile device has provided the necessary permission(s). Accordingly, a user-enabled application (such as a mobile device application integrating an example embodiment of the invention) can capture the text from extended notifications generated in connection with the user's mobile device.

By way example, one or more embodiments of the invention include implementing the following mechanism to collect notification and/or extended notification information. A notification application in User 2's mobile device, which reads a notification message from User 1's mobile device, encrypts the message with User 1's public key and transfers the encrypted message to User 1's mobile device (specifically, to User 1's mobile device notification application) through a delay tolerant network channel. Via this mechanism, User 1's notification application compiles all of the notification messages which User 1 has sent to one or more of his or her contacts and/or friends, as well as the notification messages received from others. Further, users (such as User 1 and User 2 in the above example) share a public key beforehand (that is, before exchanging notification messages) to preserve privacy throughout the data transfer.

Consequently, using this approach, a user's mobile device can facilitate collection of information and interactions carried out by the user with the user's contacts, and vice-versa, across several data sources and/or applications (such as Facebook®, Twitter®, etc.). Additionally, such collected data can be used to build a micro-managed user profile, as further detailed below.

Figure 1:
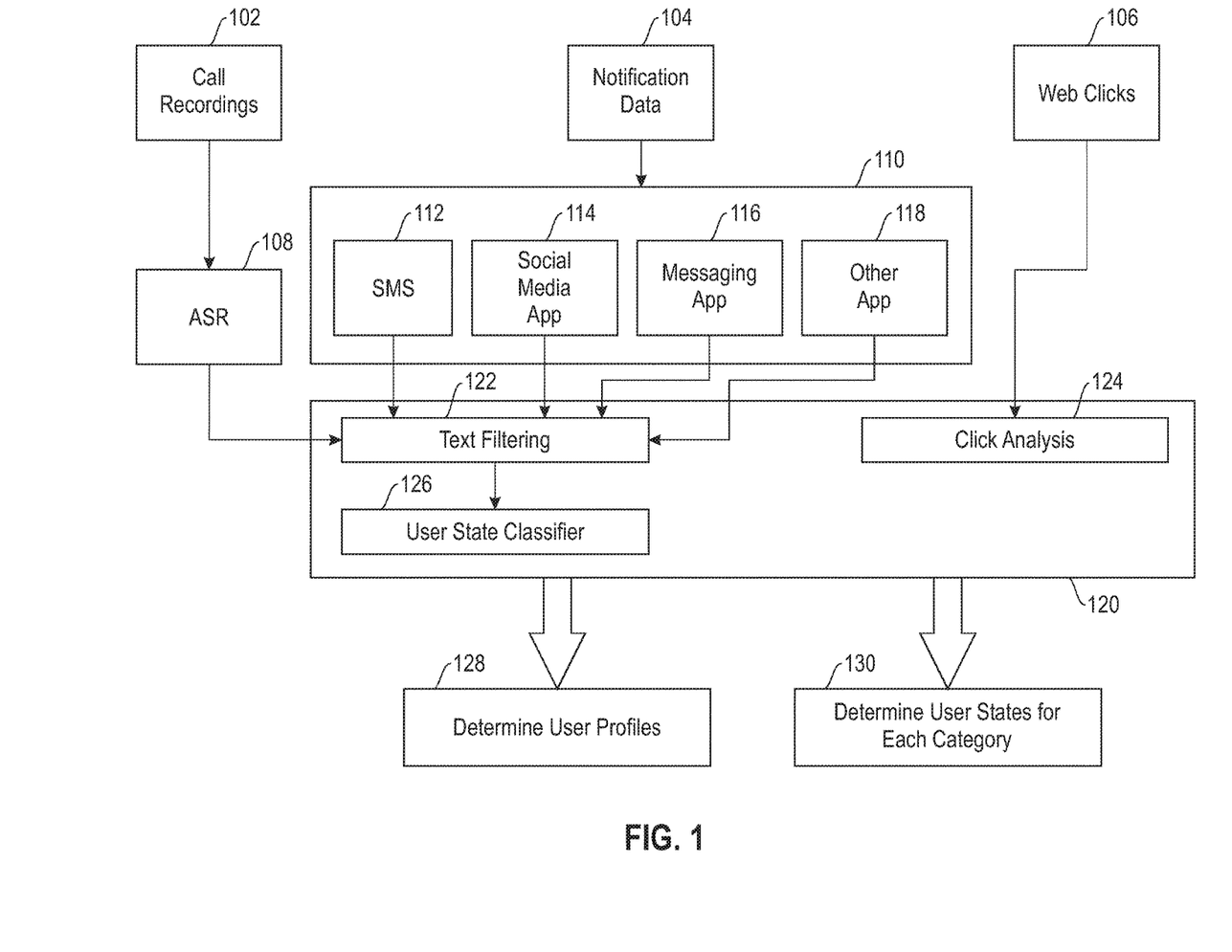
FIG. 1 is a diagram illustrating system architecture, according to an exemplary embodiment of the invention.

FIG. 1 is a diagram illustrating system architecture, according to an embodiment of the invention. By way of illustration, FIG. 1 depicts system architecture for building micro-managed user profiles. Specifically, FIG. 1 depicts call recording data 102, notification data 104, web click data 106, an application collection 110, and an analysis component 120. The call recording data 102 are provided to an automatic speech recognition (ASR) component 108, which processes the data and provides an output to a text filtering component 122 of the analysis component 120. The web click data 106 are provided to a click analysis component 124 of the analysis component 120. The click analysis component 124 counts the number of clicks for each category of interest, and outputs a numerical value (that is, count) for each category.

Additionally, the notification data 104 are provided to the application collection 110, which can include an SMS application 112, a social media application 114 (such as Facebook®, Twitter®, etc.), a messaging application 116, and one or more other applications 118. User profiles are created from the notification data 104. As also detailed herein, the notification data 104 can include access to multiple data sources via a single element. The noted applications process the provided notification data 104 and provide output to the text filtering component 122. The text filtering component 122 implements text analytics to determine the category of the interest spoken about in the message. For example, such analytics can be implemented to determine if a message is talking about food interest, retail interest, etc.

The text filtering component 122, based on the input received from the ASR component 108 and the collection of applications 110, provides output to a user state classifier component 126 (also included within the analysis component 120). Further, the analysis component 120 provides an output to a user profile determination component 128 as well as to a user state determination component 130 (that determines user states for each of multiple categories). As used herein, such a category refers to an interest of the user such as, for example, real estate, food habits, travel preferences, etc., which can be predefined in an algorithm.

Accordingly, text analytics and web click analysis methods (executed by the text filtering component 122 and the click analysis component 124, respectively) can be used to build user profiles, as well as detect and/or determine user states. In one or more embodiments of the invention, classifiers can be trained to detect a user state using bag-of-word features. Additionally, based on the web sites visited by a particular user and the number of such visit per a given temporal interval (such as a day), a user state can be determined. Also, a user state can be determined by observing the words associated with each category; any transitions in the user states are noted as well. Further, in at least one embodiment of the invention, a transition probability conditioned on each advertisement medium can be estimated. As noted herein, such an estimation can be calculated as a ratio of the number of times that the state transition occurred because of the use of the respective channel for communication divided by the total number of times that the transition occurred from state i to state j.

Figure 2:
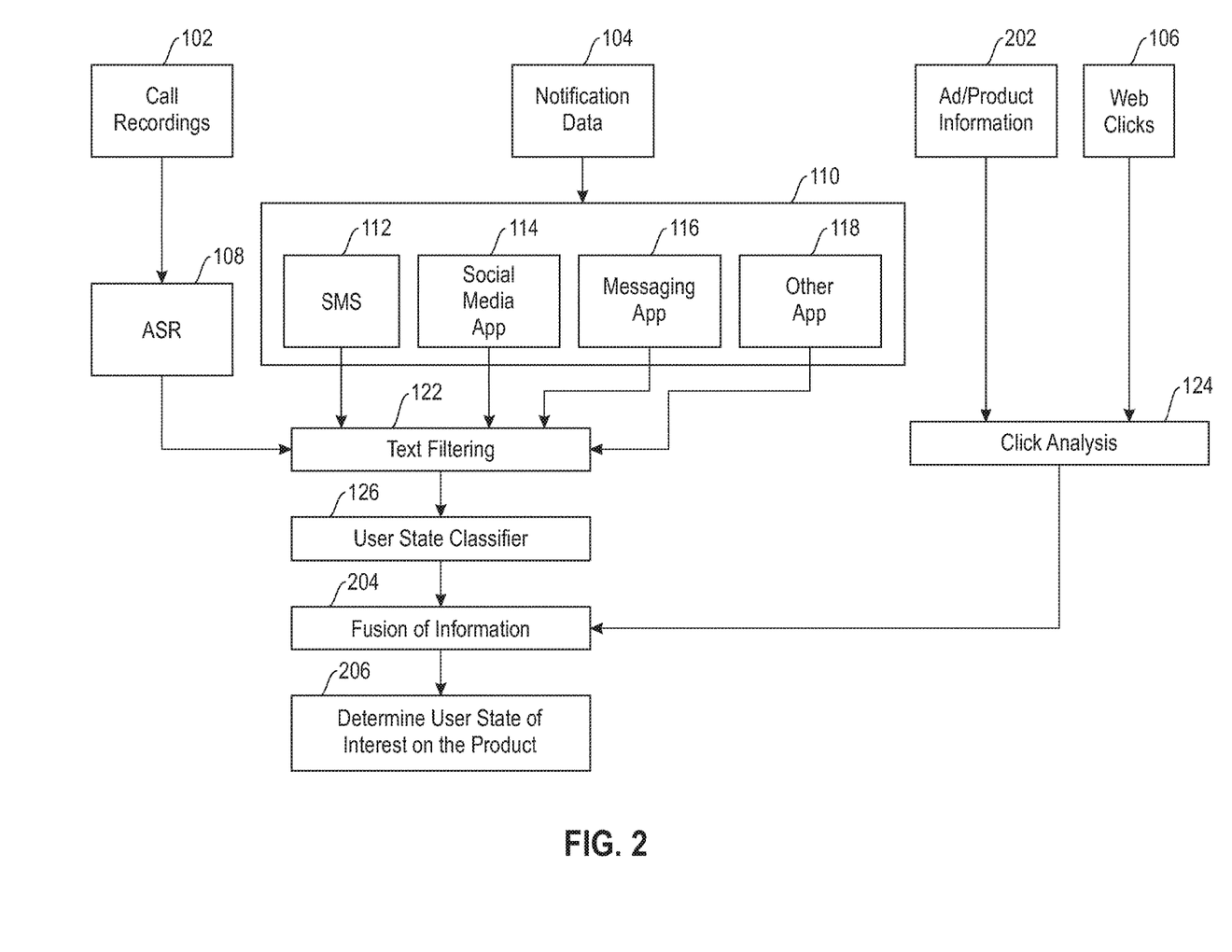
FIG. 2 is a diagram illustrating system architecture, according to an embodiment of the invention.

FIG. 2 is a diagram illustrating system architecture, according to an embodiment of the invention. By way of illustration, FIG. 2 depicts system architecture for determining a user state. As illustrated, FIG. 2 includes many of the enumerated components depicted in FIG. 1. In addition thereto, FIG. 2 also depicts advertisement and/or product information 202, which is provided as input to the text filtering component 122, as well as to the click analysis component 124. Additionally, as depicted in FIG. 2, the text filtering component 122 and the click analysis component 124 provide input to an information fusion component 204, which ultimately provides input to a user state determination component 206 that determines the user state of interest pertaining to the product in question.

The fusion component 204 determines the user state (that is, the interest level) for a particular category based on the information combined from multiple data sources. For example, from click analysis data, it is observed that the user is in state 1 with a probability value of 0.9 and state 2 with a probability value of 0.1, while from other data sources, it is observed that the user is in state 1 with a probability value of 0.6 and state 2 with a probability value of 0.4. In such a scenario, the fusion component 204 resolves the ties and outputs the state of the user. In the above example, the output would be state 1.

Figure 3:
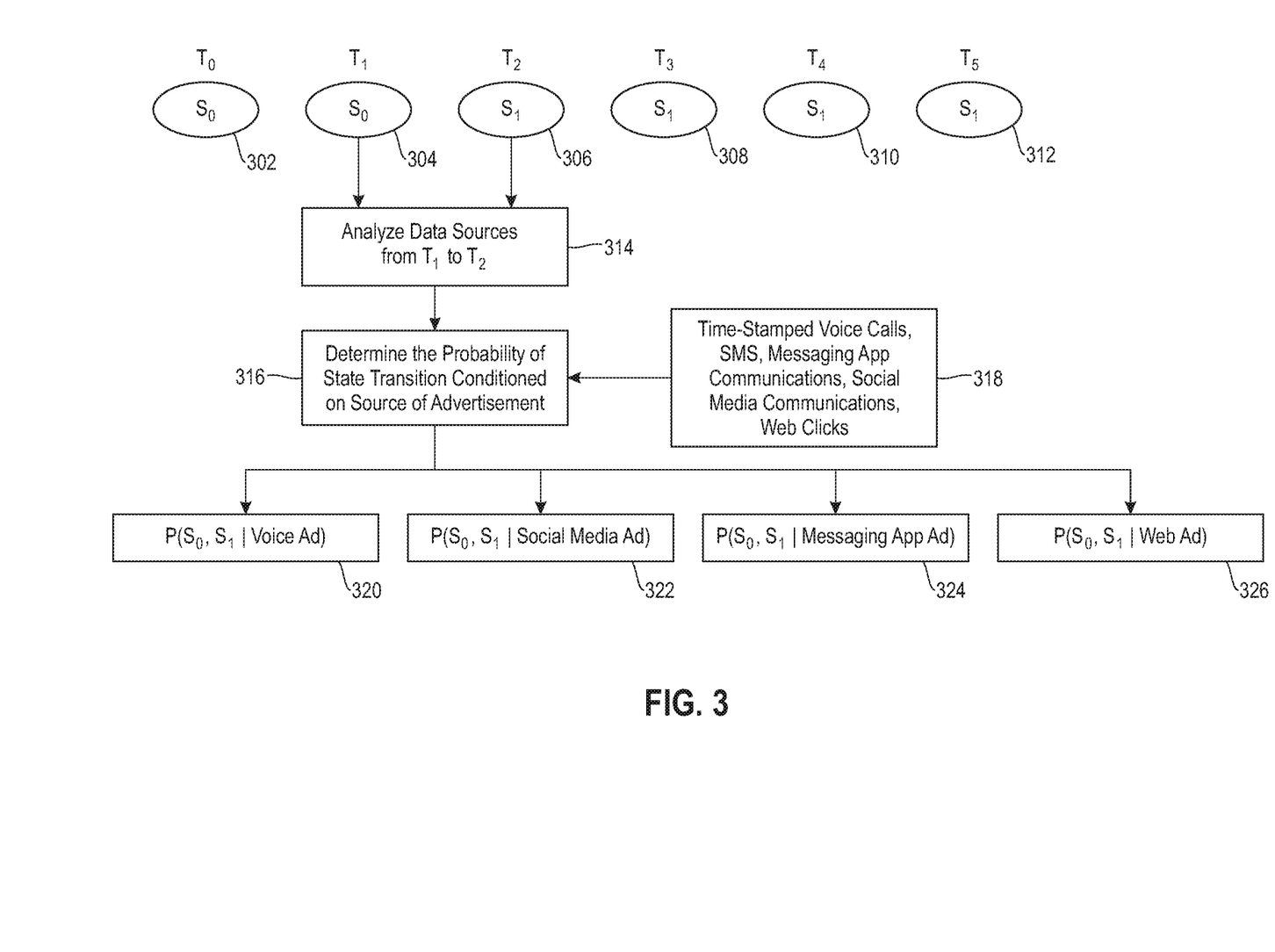
FIG. 3 is a diagram illustrating estimating conditional transitional probabilities, according to an exemplary embodiment of the invention.

FIG. 3 is a diagram illustrating estimating conditional transitional probabilities, according to an exemplary embodiment of the invention. By way of illustration, FIG. 3 depicts the user state ($S_0$) 302 at time instance $T_0$, the user state ($S_0$) 304 at time instance $T_1$, the user state ($S_1$) 306 at time instance $T_2$, the user state ($S_1$) 308 at time instance $T_3$, the user state ($S_1$) 310 at time instance $T_4$, and the user state ($S_1$) 312 at time instance $T_5$. Additionally, as depicted in FIG. 3, in step 314, data sources from $T_1$ (304) to $T_2$ (306) are analyzed, and in step 316, the probability of a state transition conditioned on the source of an advertisement is determined. In calculating the probability in step 316, time-stamped data 318 are obtained and/or provided, wherein such data can include time-stamped voice calls, SMS messages, messaging application communications, social media communications, web clicks, etc. Accordingly, various probabilities can be calculated in step 316 (as the calculation is, as noted, conditioned on the source of an advertisement). Such various probabilities are depicted in FIG. 3 via probability 320 (a voice advertisement), probability 322 (a social media advertisement), probability 324 (a messaging application advertisement), and probability 326 (a web advertisement).

Figure 4:
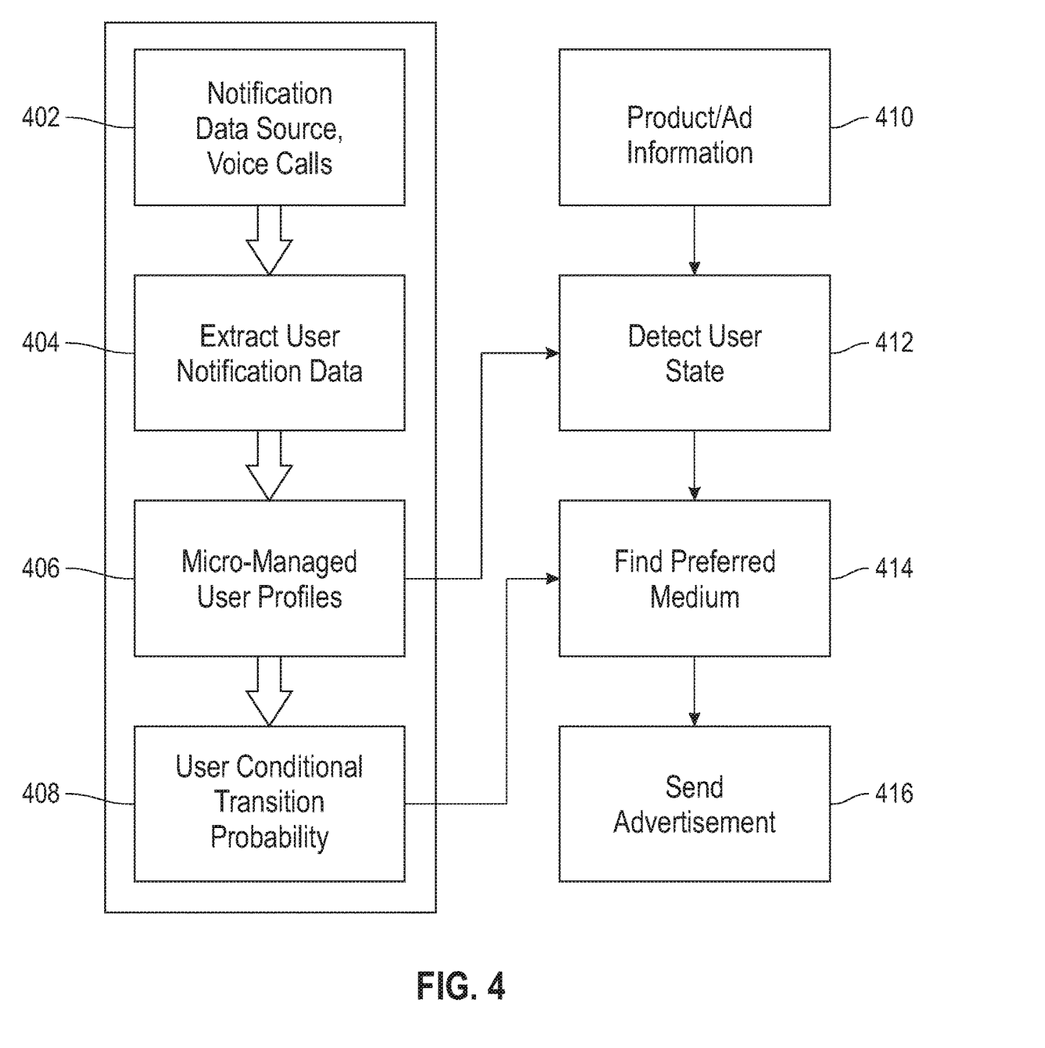
FIG. 4 is a diagram illustrating determining a medium in which to transmit a personalized advertisement to a user, according to an exemplary embodiment of the invention.

FIG. 4 is a diagram illustrating determining a medium in which to transmit a personalized advertisement to a user, according to an exemplary embodiment of the invention. By way of illustration, FIG. 4 depicts a notification source (such as voice calls) 402, which provides input to extraction component 404, which extracts user notification data from the noted input. Additionally, based on the extracted user notification data, component 406 builds one or more micro-managed user profiles, which are subsequently used by component 408 to calculate one or more user conditional transition probabilities.

Additionally, FIG. 4 also depicts product and/or advertisement information 410, which is provided along with the generated user profiles (via component 406) to component 412, which detects and/or determines the user state for the particular product. The detected user state is used along with the calculated user conditional transition probabilities (via component 408) by component 414 to find and/or determine a preferred or optimal advertisement medium and time period/time-frame for the particular user. In one or more embodiments of the invention, if transition probabilities are not available for the particular product, transition probabilities associated with other similar products can be used. Further, as depicted in FIG. 4, component 416 ultimately transmits an advertisement to the user in accordance with the preferred medium determined by component 414.

Figure 5:
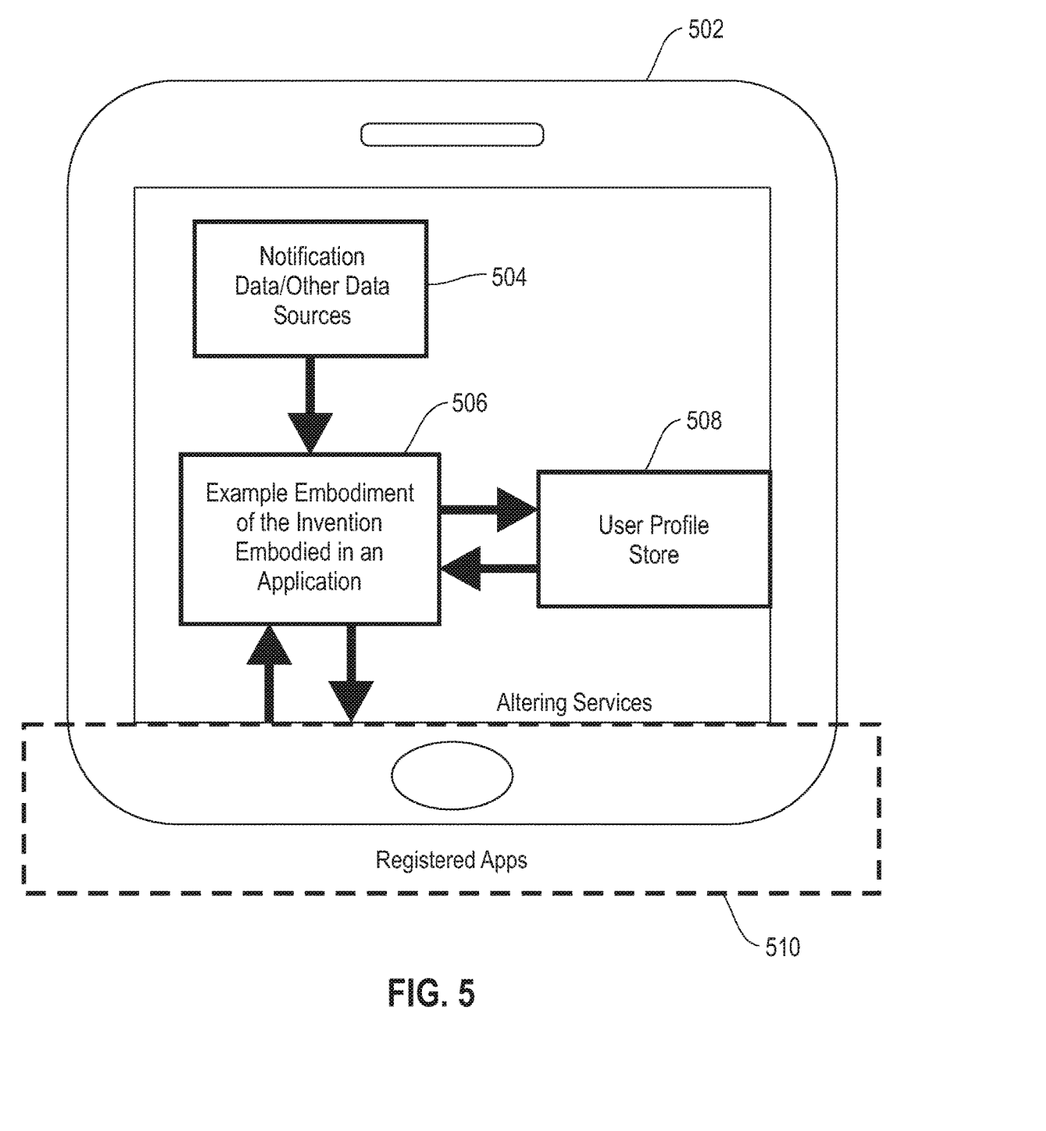
FIG. 5 is a diagram illustrating a component model, according to an exemplary embodiment of the invention.

FIG. 5 is a diagram illustrating a component model, according to an exemplary embodiment of the invention. By way of illustration, FIG. 5 depicts a user mobile device 502, which includes one or more data sources 504 for notification data as well as other data, which interacts with an application 506 embodying an embodiment of the invention, which interacts with a user profile store 508. Additionally, the application 506 embodying an embodiment of the invention interacts, via one or more alerting services, a collection of one or more registered applications 510 (which can also be resident on the mobile device 502). The noted aspects of the component model depicted in FIG. 5 interact in accordance with one or more embodiments of the invention described herein.

Figure 6:
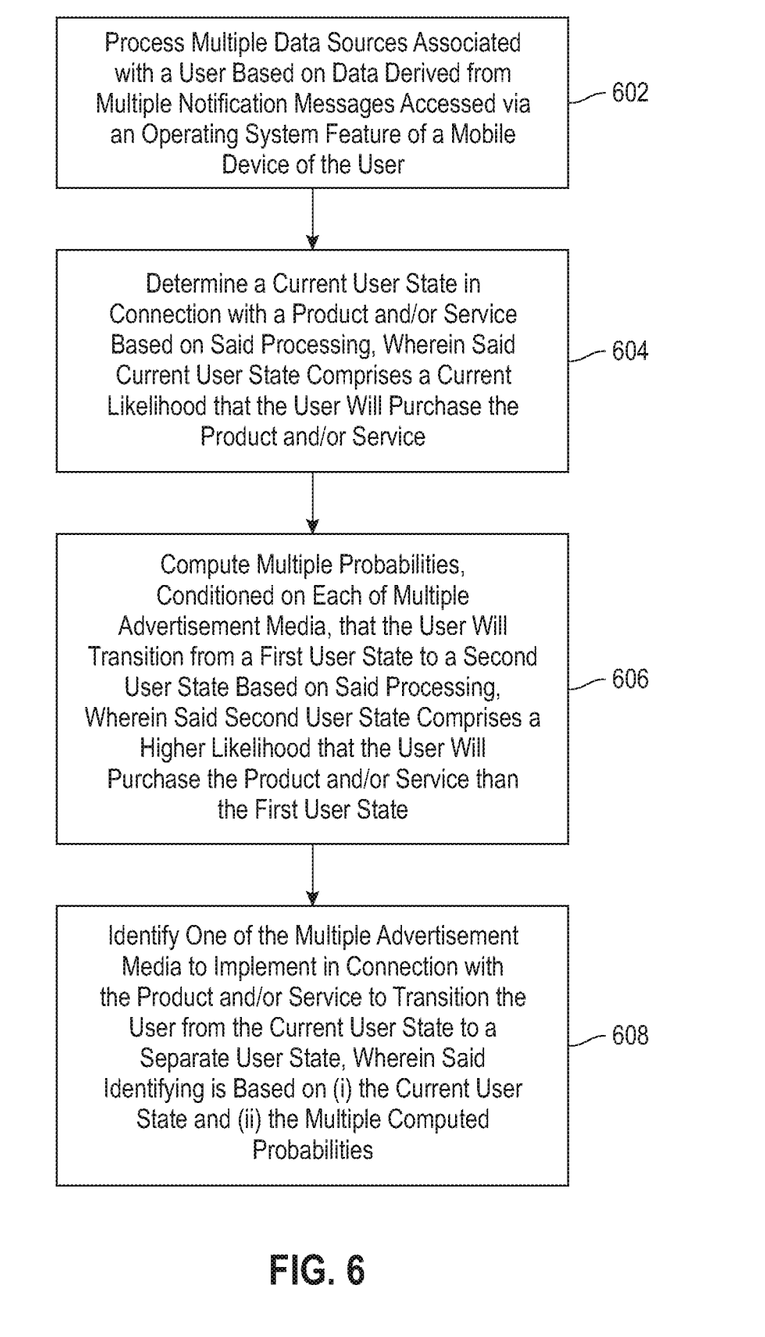
FIG. 6 is a flow diagram illustrating techniques according to an embodiment of the invention.

FIG. 6 is a flow diagram illustrating techniques according to an embodiment of the present invention. Step 602 includes processing multiple data sources associated with a user based on data derived from multiple notification messages accessed via an operating system feature of a mobile device of the user. Processing can include implementing text analytics and/or implementing one or more web click analysis methods. The notification messages can include a notification message pertaining to one or more telephone calls, a notification message pertaining to one or more emails, a notification message pertaining to one or more short message service communications, a notification message pertaining to one or more social media communications, a notification message pertaining to one or more messaging application communications, and/or a notification message pertaining to user activity on one or more websites.

Step 604 includes determining a current user state in connection with a product and/or service based on said processing, wherein said current user state comprises a current likelihood that the user will purchase the product and/or service. Determining can include training one or more classifiers using a bag-of-words model, identifying one or more websites visited by the user, and/or determining the number of visits to the one or more identified websites that were made by the user over a given temporal interval.

Step 606 includes computing multiple probabilities, conditioned on each of multiple advertisement media, that the user will transition from a first user state to a second user state based on said processing, wherein said second user state comprises a higher likelihood that the user will purchase the product and/or service than the first user state. Computing can include computing multiple probabilities, conditioned on each of the multiple advertisement media, that the user will transition from a first user state to a second user state in connection with the product and/or service. One or more embodiments of the invention can include identifying a transition flow graph for the product and/or service available for the user from historical data.

Computing can also include computing multiple probabilities, conditioned on each of the multiple advertisement media, that one or more users similar to the user will transition from a first user state to a second user state in connection with the product and/or service. As such, one or more embodiments of the invention can include identifying a transition flow graph for the product and/or service available for the one or more users similar to the user from historical data.

Additionally, computing can include computing multiple probabilities, conditioned on each of the multiple advertisement media, that the user will transition from a first user state to a second user state in connection with a second product and/or service that is related to the product and/or service. As such, one or more embodiments of the invention can include identifying a transition flow graph for the second product and/or service that is related to the product and/or service available for the user from historical data.

Step 608 includes identifying one of the multiple advertisement media to implement in connection with the product and/or service to transition the user from the current user state to a separate user state, wherein said identifying is based on (i) the current user state and (ii) the multiple computed probabilities.

In at least one embodiment of the invention, the steps depicted in FIG. 6 can be carried out by at least one computing device via an application downloaded on the at least one computing device.

Also, an additional embodiment of the invention includes computing multiple probabilities, conditioned on (i) each of multiple advertisement media and (ii) one or more temporal elements, that the user will transition from a first user state to a second user state based on said processing, wherein said second user state comprises a higher likelihood that the user will purchase the product and/or service than the first user state. Such an embodiment can additionally include identifying (i) one of the multiple advertisement media to implement in connection with the product and/or service and (ii) an interval of time during which to implement an advertisement to transition the user from the current user state to a separate user state, wherein said identifying is based on (a) the current user state and (b) the multiple computed probabilities.

The techniques depicted in FIG. 6 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 6 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 7:
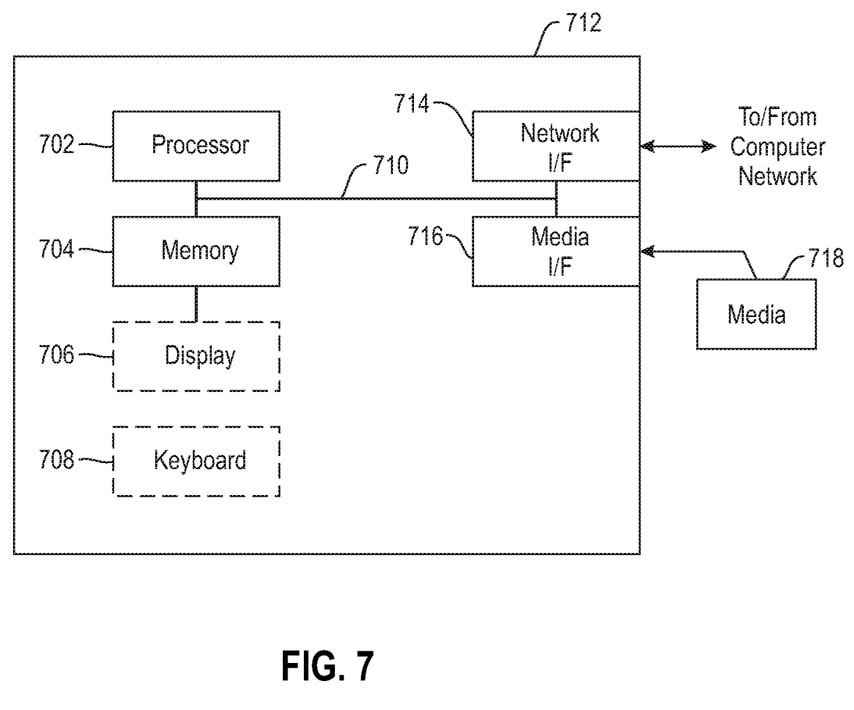
FIG. 7 is a system diagram of an exemplary computer system on which at least one embodiment of the invention can be implemented.

Additionally, an embodiment of the present invention can make use of software running on a computer or workstation. With reference to FIG. 7, such an implementation might employ, for example, a processor 702, a memory 704, and an input/output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 712 as shown in FIG. 7) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 702. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, generating and sending personalized advertisements to a user by analyzing the extended notifications received on the user's mobile device.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:

processing user activity data derived from multiple notification messages accessed via an operating system feature of a mobile device of the user, wherein the operating system feature displays, on the mobile device, the multiple notification messages pertaining to multiple software applications executing on the mobile device, wherein the user activity data comprises information (i) pertaining to user activity carried out on the mobile device via the multiple software applications and (ii) contained within the multiple notification messages, and wherein said processing the user activity data comprises processing the user activity data solely from the operating system feature, without explicit support from the multiple software applications;

determining a current user state in connection with a product and/or service based on said processing of the user activity data, wherein said current user state comprises a current likelihood that the user will purchase the product and/or service;

computing multiple probabilities, conditioned on each of multiple advertisement media, that the user will transition from a first user state to a second user state based on said processing, wherein said second user state comprises a higher likelihood that the user will purchase the product and/or service than the first user state; and identifying one of the multiple advertisement media to implement in connection with the product and/or service to transition the user from the current user state to a separate user state, wherein said identifying is based on (i) the current user state and (ii) the multiple computed probabilities;

wherein the steps are carried out by at least one computing device.

2. The computer-implemented method of claim 1, wherein said processing comprises implementing text analytics.

3. The computer-implemented method of claim 1, wherein said processing comprises implementing one or more web click analysis methods.

4. The computer-implemented method of claim 1, wherein the multiple notification messages comprise at least a notification message pertaining to one or more telephone calls.

5. The computer-implemented method of claim 1, wherein the multiple notification messages comprise at least a notification message pertaining to one or more emails.

6. The computer-implemented method of claim 1, wherein the multiple notification messages comprise at least a notification message pertaining to one or more short message service communications.

7. The computer-implemented method of claim 1, wherein the multiple notification messages comprise at least a notification message pertaining to one or more social media communications.

8. The computer-implemented method of claim 1, wherein the multiple notification messages comprise at least a notification message pertaining to one or more messaging application communications.

9. The computer-implemented method of claim 1, wherein the multiple notification messages comprise at least a notification message pertaining to user activity on one or more websites.

10. The computer-implemented method of claim 1, wherein said determining comprises training one or more classifiers using a bag-of-words model.

11. The computer-implemented method of claim 1, wherein said determining comprises identifying one or more websites visited by the user.

12. The computer-implemented method of claim 1, wherein said computing comprises computing multiple probabilities, conditioned on each of the multiple advertisement media, that the user will transition from the first user state to the second user state in connection with the product and/or service.

13. The computer-implemented method of claim 12, comprising:
identifying a transition flow graph for the product and/or service available for the user from historical data.

14. The computer-implemented method of claim 1, wherein said computing comprises computing multiple probabilities, conditioned on each of the multiple advertisement media, that one or more users similar to the user will transition from the first user state to the second user state in connection with the product and/or service.

15. The computer-implemented method of claim 14, comprising:
identifying a transition flow graph for the product and/or service available for the one or more users similar to the user from historical data.

16. The computer-implemented method of claim 1, wherein said computing comprises computing multiple probabilities, conditioned on each of the multiple advertisement media, that the user will transition from the first user state to the second user state in connection with a second product and/or service that is related to the product and/or service.

17. The computer-implemented method of claim 16, comprising:
identifying a transition flow graph for the second product and/or service that is related to the product and/or service available for the user from historical data.

18. A computer program product, the computer program product comprising a non-transitory computer readable storage medium having program instructions embodied therewith, the program instructions executable by a device to cause the device to:

process user activity data derived from multiple notification messages accessed via an operating system feature of a mobile device of the user, wherein the operating system feature displays, on the mobile device, the multiple notification messages pertaining to multiple software applications executing on the mobile device, wherein the user activity data comprises information (i) pertaining to user activity carried out on the mobile device via the multiple software applications and (ii) contained within the multiple notification messages, and wherein said processing the user activity data comprises processing the user activity data solely from the operating system feature, without explicit support from the multiple software applications;

determine a current user state in connection with a product and/or service based on said processing of the user activity data, wherein said current user state comprises a current likelihood that the user will purchase the product and/or service;

compute multiple probabilities, conditioned on each of multiple advertisement media, that the user will transition from a first user state to a second user state based on said processing, wherein said second user state comprises a higher likelihood that the user will purchase the product and/or service than the first user state; and identify one of the multiple advertisement media to implement in connection with the product and/or service to transition the user from the current user state to a separate user state, wherein said identifying is based on (i) the current user state and (ii) the multiple computed probabilities.

19. A system comprising:
a memory; and
at least one processor coupled to the memory and configured for:
processing user activity data derived from multiple notification messages accessed via an operating system feature of a mobile device of the user, wherein the operating system feature displays, on the mobile device, the multiple notification messages pertaining to multiple software applications executing on the mobile device, wherein the user activity data comprises information (i) pertaining to user activity carried out on the mobile device via the multiple software applications and (ii) contained within the multiple notification messages, and wherein said processing the user activity data comprises processing the user activity data solely from the operating system feature, without explicit support from the multiple software applications;

determining a current user state in connection with a product and/or service based on said processing of the user activity data, wherein said current user state comprises a current likelihood that the user will purchase the product and/or service;

computing multiple probabilities, conditioned on each of multiple advertisement media, that the user will transition from a first user state to a second user state based on said processing, wherein said second user state comprises a higher likelihood that the user will purchase the product and/or service than the first user state; and identifying one of the multiple advertisement media to implement in connection with the product and/or service to transition the user from the current user state to a separate user state, wherein said identifying is based on (i) the current user state and (ii) the multiple computed probabilities.

20. A computer-implemented method, comprising:

processing user activity data derived from multiple notification messages accessed via an operating system feature of a mobile device of the user, wherein the operating system feature displays, on the mobile device, the multiple notification messages pertaining to multiple software applications executing on the mobile device, wherein the user activity data comprises information (i) pertaining to user activity carried out on the mobile device via the multiple software applications and (ii) contained within the multiple notification messages, and wherein said processing the user activity data comprises processing the user activity data solely from the operating system feature, without explicit support from the multiple software applications;

determining a current user state in connection with a product and/or service based on said processing of the user activity data, wherein said current user state comprises a current likelihood that the user will purchase the product and/or service;

computing multiple probabilities, conditioned on (i) each of multiple advertisement media and (ii) one or more temporal elements, that the user will transition from a first user state to a second user state based on said processing, wherein said second user state comprises a higher likelihood that the user will purchase the product and/or service than the first user state; and identifying (i) one of the multiple advertisement media to implement in connection with the product and/or service and (ii) an interval of time during which to implement an advertisement to transition the user from the current user state to a separate user state, wherein said identifying is based on (a) the current user state and (b) the multiple computed probabilities;

wherein the steps are carried out by at least one computing device.

* * * * *